United States Patent [19]

Obrecht et al.

[11] Patent Number: 4,814,401
[45] Date of Patent: Mar. 21, 1989

[54] POLYMERIZATION OF CHLOROPRENE WITH XANTHATES AND DITHIOCARBAMATES

[75] Inventors: Werner Obrecht, Moers; Peter Wendling; Wilhelm Göbel, both of Leverkusen; Eberhard Müller, Dormagen, all of Fed. Rep. of Germany

[73] Assignee: Bayer Aktiengesellschaft, Leverkusen, Fed. Rep. of Germany

[21] Appl. No.: 161,990

[22] Filed: Feb. 29, 1988

Related U.S. Application Data

[63] Continuation of Ser. No. 913,992, Oct. 1, 1986, abandoned.

[30] Foreign Application Priority Data

Oct. 3, 1985 [DE] Fed. Rep. of Germany ....... 3535248

[51] Int. Cl.$^4$ ............................. C08F 2/38; C08F 2/24
[52] U.S. Cl. .................................... 526/204; 526/220; 526/222
[58] Field of Search ................ 526/204, 205, 220, 222

[56] References Cited

U.S. PATENT DOCUMENTS 2,426,854  9/1947  Bare .
2,430,562  11/1947  Fryling .
3,808,183  4/1974  Branlard .
3,984,609  10/1976  Branlard .

FOREIGN PATENT DOCUMENTS 3507825  9/1986  Fed. Rep. of Germany .
1480110  4/1967  France .
2098562  3/1972  France .
1051349  12/1966  United Kingdom .

OTHER PUBLICATIONS

Houben–Weyl, Methoden der Organischen Chemie, 4., Auflage (1961), pp. 351, 352.

Primary Examiner—Christopher Henderson
Attorney, Agent, or Firm—Connolly and Hutz

[57] ABSTRACT

An improved process for the preparation of polychloroprene by the emulsion (co)polymerization of chloroprene and optionally other monomers capable of copolymerization with chloroprene, using a peroxo activator, and subsequent working up of the product by stopping the reaction, stabilizing, degassing and isolating the product, characterized in that polymerization is carried out in the presence of dithiocarbamates and/or xanthates and 0 to 0.5% by weight of sodium β-anthraquinone sulphonate.

7 Claims, No Drawings

POLYMERIZATION OF CHLOROPRENE WITH XANTHATES AND DITHIOCARBAMATES

This is a continuation of application Ser. No. 913,992 filed Oct. 1, 1986, now abandoned.

It is known that chloroprene (CP) may be polymerised in the presence of suitable activators, either alone or with up to 20% by weight, based on the total monomer quantity, of other monomers, such as 2,3-dichlorobutadiene (DCB), 1-chlorobutadiene, butadiene, isoprene, acrylic acid, methacrylic acid, acrylonitrile or methacrylonitrile.

This polymerisation is generally carried out at temperatures in the range of 0° C. to 70° C. The micro structure of the polychloroprene obtained depends on the polymerisation temperature, the proportion of trans-1,4-structures increasing with decreasing polymerisation temperature. Since trans-1,4 structures crystallize, both the degree of crystalllinity and the speed of crystallization as well as the capacity for elongation crystallization increase with decreasing polymerisation temperature (P. R. Johnson, Rubber Chem. Techn. 49, 650–702 (1976)). Since the tensile strength of vulcanisates depends directly on the capacity for elongation crystallization (A. K. Bhownick, A. K. Gent, Rubber Chem. Techn. 56, 845 (1983)), it would be obvious to obtain vulcanisates with improved tensile strength by lowering the polymerisation temperature. A lowering in polymerisation temperature has, however, various disadvantages. It reduces the polymerisation velocity and hence also the volume/time yield of a plant. The difference between the polymerisation temperature and the temperature of the cooling medium (generally tap water) is also reduced so that it becomes necessary either to use a different cooling medium or to increase the area of the cooling surfaces if adequate cooling is to be obtained. If the difference between the polymerisation temperature and the temperature of the cooling medium is too slight, the polymerisation temperature is much more difficult to adjust. Since, moreover, the degree of crystallization and the speed of crystallization of the polymer increase with decreasing polymerisation temperature, the vulcanisate becomes unsuitable for certain purposes due to excessive hardening. Unduly rapid hardening of rubber mixtures, especially during storage, is also undesirable. The problem may be alleviated by carrying out a copolymerisation with a comonomer which interfers with crystallization, such as 2,3-dichlorobutadiene, but this method renders the process less economical.

It was an object of the present invention to develop a process by which the products obtained would have a higher tensile strength than that which would be expected at the given reaction temperature. Such a process would be more economical than the known processes and would result in more uniform products owing to the greater constancy of the temperature.

To solve this problem according to the invention, polymerisation or copolymerisation of chloroprene is carried out with peroxo catalysts in the presence of dithiocarbamates and/or xanthates and optionally sodium β-anthraquinone sulphonate ("silver salt").

The possibility of carrying out this polymerisation in the presence of dithiocarbamates and xanthates was unexpected since these compounds are used as stopping agents in the emulsion polymerisation of chloroprene (FR-P No. 1,480,110).

The present invention therefore relates to a process for the preparation of polychloroprene by emulsion (co)polymerisation of chloroprene and optionally other monomers copolymerisable with chloroprene, using a peroxo activator, and subsequent working up of the product by stopping, stabilizing, degassing and isolating, characterised in that polymerisation is carried out in the presence of dithiocarbamates and/or xanthates and 0 to 0.5% by weight of silver salt as a co-activator.

Suitable polychloroprene rubbers contain up to 30% by weight of other monomers such as, for example, 2,3-dichlorobutadiene, 1-chlorobutadiene, butadiene, isoprene, acrylic acid, methacrylic acid, acrylonitrile or methacrylonitrile, preferably up to 20% by weight of 2,3-dichlorobutadiene incorporated by polymerisation.

Examples of suitble activators include persulphates, perborates, percarbonates, perphosphates and $H_2O_2$, preferably water soluble salts of peroxodisulphuric acid. The activators are preferably used in a molar quantity corresponding to 0.03 to 3.0% by weight, in particular 0.1 to 1.0% by weight of potassium peroxodisulphate, based on the quantity of monomers.

5 to 30% of the total quantity of peroxy activator is preferably added at the onset of polymerisation and the remaining 70 to 95% during polymerisation, either portionwise or continuously.

Sodium anthraquinone-2-sulphonate is preferably used in a quantity of from 0.005 to 0.1% by weight, based on the monomers. It is either added as a solution together with the peroxy activator or, preferably, introduced quantitatively together with the polymerisation reaction mixture before activation takes place.

Polymerisation is carried out at temperatures of from $-10°$ to 70° C., preferably at 0° to 50° C.

Xanthogen disulphides and preferably mercaptans are used as regulators.

Suitable agents for stopping polymerisation include, for example, pyrocatechol and especially diethyl hydroxylamine, which is used in a quantity of from 0.05 to 0.15% by weight, based on the monomers, preferably in the form of an aqueous solution.

The usual age resistors such as sterically hindered phenol derivatives, phosphites, xanthogen disulphides or thiuramic disulphides are used to improve the storage stability of the polymer. It is preferred to use mixtures of such age resistors in which one component is preferably a tetraalkyl thiuramic disulphide. The age resistor is added to the latex in the form of an aqueous dispresion, organic solution or aqueous emulsion of an organic solution before or after removal of unreacted monomer. Up to 6% by weight of tetraethyl thiuramic disulphide (TETD), based on the monomers, or a corresponding molar quantity of another compound is added.

The dithiocarbamates and xanthates are preferably used in the form of their alkali metal salts, in particular sodium, potassium or ammonium salts.

Suitable dithiocarbamate anions correspond to the formula

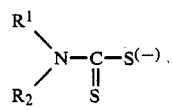

and suitable xanthate anions to the formula

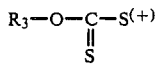

wherein $R_1$, $R_2$ and $R_3$ denote an optionally substituted alkyl, cycloalkyl or aryl group and in addition $R_1$ and $R_2$ together with the nitrogen atom may form a ring, and $R_1$, $R_2$ and $R_3$ may contain hetero atoms.

$R_1$ and $R_2$ are preferably $C_1$–$C_4$ alkyl groups and $R_3$ is preferably a $C_1$–$C_8$ alkyl group or 2,2-(2,4-dioxapentamethylene)-butyl.

It is preferred to use from 0.05 to 5.0% by weight, in particular from 0.1 to 3.0% by weight, based on the monomers, of sodium dibutyl dithiocarbamate or a corresponding molar quantity of some other other dithiocarbamate or from 0.1 to 5.0% by weight, in particular from 0.5 to 3.0% by weight of potassium ethyl xanthate, based on the monomers, or a corresponding molar quantity of another xanthate.

EXAMPLES

The experiments are based on the following basic formulation (batch experiments, parts given in parts by weight):

| | |
|---|---|
| Chloroprene and comonomer: | 100 |
| n-dodecyl mercaptan (n-DDM): | see tables |
| salt-free water: | 110 |
| disproportionated abietic acid: | 2.8 |
| sodium salt of the condensation product of naphthalene sulphonic acid and formaldehyde: | 0.65 |
| KOH: | 0.60 |
| $K_2S_2O_8$: | see tables |
| silver salt: | see tables |
| additive: | see tables |

The experiments were carried out in a 20 liter reactor with stirrer. The aqueous phase consisting of salt-free water, disproportionated abietic acid, KOH, silver salt and the sodium salt of the condensation product of naphthalene sulphonic acid and formaldehyde was introduced into this vessel, flushed with nitrogen and heated to 45° C. (exception: Example k to 25° C.). The monomer or monomer mixture which had been flushed with nitrogen was then added, followed by the additive in the form of an aqueous solution.

Activation was carried out in each case with a small quantity of $K_2S_2O_8$:

Examples (c), (d), (e), (j): 0.015 parts by weight $K_2S_2O_8$

Examples (a), (b), (f): 0.020 parts by weight $K_2S_2O_8$

Examples (g), (h), (i): 0.030 parts by weight $K_2S_2O_8$

Example (k): 0.006 parts by weight $K_2S_2O_8$

The persulphate solution was added as an aqueous solution which had been flushed with nitrogen:

Examples (c), (d), (e), (j): 0.7% by weight $K_2S_2O_8$ solution

Examples (a), (b), (f): 1.4% by weight $K_2S_2O_8$ solution

Examples (g), (h), (i): 2.0% by weight $K_2S_2O_8$ solution

Example (k): 3.0% by weight $K_2S_2O_8$ solution $K_2S_2O_8$ was added in the course of the experiments in the form of the above described diluted aqueous solutions which had been flushed with nitrogen:

Examples (c), (d), (e), (j): $3.5 \times 10^{-4}$ parts by weight $K_2S_2O_8$ per minute.

Examples (a), (b), (c): $7.5 \times 10^{-4}$ parts by weight $K_2S_2O_8$ per minute Examples (g), (h), (i): $2.25 \times 10^{-3}$ parts by weight $K_2S_2O_8$ per minute Example (k): $3.0 \times 10^{-4}$ parts by weight $K_2S_2O_8$ per minute The total quantities of persulphate required for obtaining the conversion rates indicated are entered in the tables. The part by weight of salt-free water given in the basic formulation is increased by the quantity of water added with the aqueous solutions.

Polymerisation was carried out at 45° C. under nitrogen (Example k)=25° C.).

The conversion rates were followed by gravimetric determinations. In the various experiments, polymerisation was stopped with 0.03 parts by weight, based on the latex, of an aqueous 2.5% by weight solution of diethyl hydroxylamine when the conversion rate entered in the table was reached.

The latex was degassed to a residual chloroprene content of about 500 ppm (based on the latex). The degassed latex was adjusted to pH 6.5 with 20% by weight acetic acid, the polymer was isolated by freezing coagulation and washed with salt-free water and the sheets obtained were freed from water down to a residual moisture content of about 30% by weight by passing them through squeezing rollers and then dried to a residual moisture content of $\leq 0.5\%$ by weight in a circulating air drying cupboard at 70° C.

Any changes to this method are noted in the following tables.

COMPARISON EXAMPLES

Comparison Example 1

This comparison example was carried out according to DE-OS No. 3,002,711, Example 13. Formamidine sulphinic acid was used as an activator. The polymer was obtained without comonomer at a polymerisation temperature of 45° C. and a conversion rate of 65%.

COMPARISON EXAMPLE 2

This comparison example was carried out according to DE-OS No. 3,002,711, example 7. Formamidine sulphinic acid was used as an activator. The polymer was obtained with 5.4% by weight of 2,3-dichlorobutadiene as comonomer, based on the total quantity of monomer, at a polymerisation temperature of 45° C. and a conversion rate of 65%.

COMPARISON EXAMPLE 3

The comparison example was carried out according to DE-OS No. 3,105,339 (preparation of the sol polymer). Formamidine sulphinic acid was used as an activator. The polymer was obtained without comonomer, at a polymerisation temperature of 30° C. and a conversion rate of 71%.

COMPARISON EXAMPLE 4

Similar to Comparison Example 2 but polymerisation was carried out at 30° C.

COMPARISON EXAMPLE 5

The comparison example was carried out according to DE-OS No. 3,002,711 Example 13 but different from this example in that the activator used was not formamidine sulphinic acid but sodium dithionite and potassium peroxodisulphite according to EP-OS No. 34,747, example 14a. 0.011 parts by weight of sodium dithionite and 0.075 parts by weight of potassium peroxodisulphate were required. The aqueous phase contained 7 mg $O_2$ per liter of emulsifier phase. The polymer was obtained without comonomer at a polymerisation temperature of 45° C. and a conversion rate of 65%.

COMPARISON EXAMPLES 6 AND 7

The comparison examples were carried out by the methods according to the invention of examples (g), (h), (i), (j) but differed from these examples in that no additive (dithiocarbamate or xanthate) was used.

The following determinations were carried out on the crude rubbers.

The Mooney viscosity (ML 1+4) was determined according to DIN 53,523, part 1-3, at 100° C.

The Mooney stability after hot air ageing (δML) was determined as a difference between the Mooney values of rolled sheets before and after 72 hours storage at 70° C. A positive sign indicates an increase in Mooney viscosity after hot air ageing and conversely.

The vulcanizations were carried out on the basis of the following mixture:

Iso mixture 2475:
- 100.0 parts by weight of polymer
- 0.5 parts by weight of stearic acid
- 2.0 parts by weight of phenyl-β-naphthylamine
- 30.0 parts by weight of carbon black (N 762)
- 4.0 parts by weight of magnesium oxide
- 5.0 parts by weight of active zinc oxide
- 0.5 parts by weight of ethylene thiourea.

The test mixture was vulcanized at 150° C. in a shearing vulcameter according to DIN 53 529 and the highest $t_{10}$, $t_{80}$ and $t_R$ values were determined. $t_{10}$ and $t_{80}$ are the times at which 10% and 80%, respectively, of the conversion rate determined in the vulcameter are reached. $t_R$ is obtained as the difference of $t_{80}$–$t_{10}$.

The tensile strength, elongation at break and modulus at 300% elongation are determined on the vulcanisate in accordance with DIN 53 504 after a vulcanisation time of 30 minutes.

TABLE 1

Conditions of preparations of examples (a) to (f)

| Experiment | Monomer CP | Monomer DCB | n-DDM | dibutyl-dithio carbamate | $K_2S_2O_8$ | Silver | Temperature (°C.) | Monomer conversion (%) | Polymerisation time (min) |
|---|---|---|---|---|---|---|---|---|---|
| (a) | 100 | — | 0.31 | 0.5 | 0.11 | 0.02 | 45 | 65 | 122 |
| (b) | 100 | — | 0.31 | 1.0 | 0.10 | 0.02 | 45 | 65 | 105 |
| (c) | 100 | — | 0.285 | 2.0 | 0.07 | 0.01 | 45 | 64 | 150 |
| (d) | 100 | — | 0.285 | 3.0 | 0.06 | 0.01 | 45 | 65 | 135 |
| (e) | 100 | — | 0.30 | 3.0 | 0.06 | 0.01 | 45 | 63 | 138 |
| (f) | 94.6 | 5.4 | 0.31 | 1.0 | 0.08 | 0.02 | 45 | 65 | 85 |

TABLE 2

Properties for technological application of Examples (a) to (f)

| Experiment | ML 1 + 4 (ME) | ΔML (72 h) (ME) | $t_{10}$ (min) | $t_{80}$ (min) | $t_R$ (min) | tensile strength (MPa) | Elongation at break (%) | M at 300% elongation (MPa) |
|---|---|---|---|---|---|---|---|---|
| (a) | 43 | +6 | 3 | 17 | 14 | 20.5 | 490 | 11.2 |
| (b) | 45 | +5 | 3 | 18 | 15 | 20.3 | 480 | 11.0 |
| (c) | 46 | +3 | 3 | 18 | 15 | 20.4 | 500 | 10.3 |
| (d) | 43 | +2 | 4 | 17 | 13 | 20.1 | 470 | 11.4 |
| (e) | 36 | +2 | 3 | 17 | 14 | 20.0 | 500 | 10.4 |
| (f) | 52 | +6 | 3 | 18 | 15 | 20.0 | 490 | 10.9 |

TABLE 3

Conditions for preparation of comparison examples (1)–(5)

| Comparison Example | Monomer CP | Monomer DCB | n-DDM | Temperature (°C.) | monomer conversion (%) | Polymerisation time (min) | activator |
|---|---|---|---|---|---|---|---|
| (1) | 100 | — | 0.20 | 45 | 65 | 225 | formamidine-sulphinic acid |
| (2) | 94.6 | 5.4 | 0.20 | 45 | 65 | 200 | formamidine-sulphinic acid |
| (3) | 100 | — | 0.24 | 30 | 71 | 266 | formamidine-sulphinic acid |
| (4) | 94.6 | 5.4 | 0.20 | 30 | 65 | 257 | formamidine-sulphinic acid |
| (5) | 100 | — | 0.25 | 45 | 65 | 150 | Na—dithionite/$K_2S_2O_8$ |
| (6) | 100 | — | 0.25 | 45 | 65 | 279 | $K_2S_2O_8$/silver salt. |

TABLE 4

Properties for technological application of comparison examples (1)-(6)

| Comparison Example | ML 1 + 4 (ME) | ΔML (72 h) (ME) | $t_{10}$ (min) | $t_{80}$ (min) | $t_R$ (min) | Tensile strength (MPa) | Elongation at break (%) | M at 300% elongation (MPa) |
|---|---|---|---|---|---|---|---|---|
| 1 | 45 | ±0 | 3 | 16 | 13 | 17.8 | 410 | 12.5 |
| 2 | 45 | −1 | 3 | 17 | 14 | 18.0 | 430 | 11.6 |
| 3 | 41 | +4 | 3 | 18 | 15 | 19.8 | 500 | 10.0 |
| 4 | 76 | +2 | 4 | 19 | 15 | 20.0 | 440 | 13.1 |
| 5 | 66 | +1 | 3 | 18 | 15 | 18.0 | 450 | 10.7 |
| 6 | 45 | +4 | 3 | 16 | 13 | 17.8 | 440 | 10.8 |

TABLE 5

Conditions for preparation and course of polymerisation in Examples (g)–(k) and comparison examples (6) and (7); monomer conversion in each case 65%

| | Chloroprene | n-DDM | dibutyl dithiocarbamate (Na salt) | 2-ethylhexyl-xanthate (K salt) | $K_2S_2O_8$ | silver salt | Temperature (°C.) | Inhibition time (min) | Conversion per minute[1] (% · min$^{-1}$) | Polymerisation time (Min) |
|---|---|---|---|---|---|---|---|---|---|---|
| Example | | | | | | | | | | |
| (g) | 100 | 0.25 | 2.5 | — | 0.26 | 0.03 | 45 | <1 | 2.3 | 30 |
| (h) | 100 | 0.25 | 1.0 | — | 0.35 | 0.03 | 45 | <1 | 1.4 | 45 |
| (i) | 100 | 0.25 | 0.1 | — | 0.51 | 0.03 | 45 | <1 | 1.4 | 60 |
| (j) | 100 | 0.32 | — | 1.0 | 0.30 | 0.03 | 45 | <1 | 1.6 | 100 |
| (k) | 100 | 0.23 | 1.0 | — | 0.05 | 0.02 | 25 | <1 | 0.80 | 140 |
| Comparison Examples | | | | | | | | | | |
| (6) | 100 | 0.25 | — | — | 0.47 | 0.03 | 45 | 175 | 1.4 | 279 |
| (7) | 100 | 0.25 | — | — | 0.47 | 0.03 | 45 | 148 | 1.6 | 266 |

[1]Calculated from the linear part of the time/conversion graph.

Compared with the state of the art examples, the examples according to the invention demonstrate that 1. The induction periods before the onset of polymerisation are reduced by the addition of dithiocarbamate and xanthate,
2. The polymerisation times for reaching comparable conversion rates are reduced according to the invention and
3. the tensile strengths of the products according to the invention are superior to those of state of the art products prepared at the same temperature.

We claim:

1. In the process for the preparation of polychloroprene by emulsion (co)polymerization of chloroprene using a peroxo activator, and subsequent working up by stopping, stabilizing, degassing and isolating the polychloroprene, the improvement comprises conducting the polymerization in the presence of from $2.2 \times 10^{-4}$ to $2.2 \times 10^{-2}$ mol, based on 100 g of monomeric copolymerizable starting materials, of dithiocarbamate whose dithiocarbamate anion corresponds to the formula

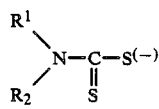

or from $6.24 \times 10^{-4}$ to $3.12 \times 10^{-2}$ mol, based on the quantity of monomeric copolymerizable starting materials, of xanthate, whose xanthate anion corresponds to the formula

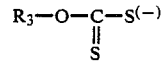

or of a mixture of both, wherein $R_1$, $R_2$ and $R_3$ denote an unsubstituted alkyl, cycloalkyl or aryl group or $R_1$ and $R_2$ together with a nitrogen atom form a heterocyclic ring or $R_1$, $R_2$ and $R_3$ are alkyl, cycloalkyl or aryl wherein at least one carbon atom is replaced by a hetero atom, or $R_3$ is 2,2-(2,4-dioxapentamethylenebutyl), and in the presence of from 0.005 to 0.1% by weight of sodium anthraquinone-2-sulphonate.

2. Process according to claim 1 wherein polymerization is in the presence of the dithiocarbamate in an amount ranging from $4.4 \times 10^{-4}$ to $1.32 \times 10^{-2}$ mol per 100 g of monomeric copolymerizable starting materials.

3. Process according to claim 1 wherein polymerization is in the presence of the xanthate in an amount ranging from $3.12 \times 10^{-3}$ to $1.87 \times 10^{-2}$ mole per 100 g of monomeric copolymerizable starting material.

4. Process according to claim 1 wherein $R_1$ and $R_2$ denote $C_1$-$C_4$ alkyl and $R_3$ denotes $C_1$-$C_8$ alkyl or 2,2-(2,4-dioxapentamethylene)-butyl.

5. Process according to claim 1 wherein from 0.05 to 5.0% by weight of sodium dibutyl dithiocarbamate, based on the quantity of monomers, or from 0.1 to 5.0% by weight of potassium methyl xanthate, based on the quantity of monomers, are used.

6. Process according to claim 1, characterised in that chloroprene is polymerised or copolymerised with up to 30% by weight, based on the total quantity of monomers, of 2,3-dichlorobutadiene, 1-chlorobutadiene, butadiene, isoprene, acrylic acid, methacrylic acid, acrylonitrile or methacrylonitrile.

7. Process according to claim 1, characterised in that the dithiocarbamates and xanthates are used in the form of their alkali metal salts.

* * * * *